United States Patent Office 3,364,056
Patented Jan. 16, 1968

3,364,056
FLAME AND HALOGEN TREATMENT OF A POLYOLEFIN TO IMPROVE ADHESIVITY
Markus Seibel, Mainz, Germany, assignor to Kalle Aktiengesellschaft, Wiesbaden-Biebrich, Germany
No Drawing. Filed May 22, 1964, Ser. No. 369,630
Claims priority, application Germany, May 25, 1963, K 49,833
4 Claims. (Cl. 117—46)

ABSTRACT OF THE DISCLOSURE

This invention relates to a process for the production of an improved polyolefin product wherein the surface of a polyolefin is treated with the flame of a burning gas mixture containing a halogen and/or a halogen-containing compound until the adhesivity of the surface for a synthetic plastic coating has been increased.

As is known, an article made from a polyolefin generally has very little adhesivity to coatings thereon of other synthetic plastic materials. e.g. lacquer coatings obtained by the application of solutions of such plastic materials, unless the surface of the article has been subjected to some special treatment before the coating operation. A number of processes for improving the adhesivity have been proposed, some of which have proved satisfactory in some cases. Thus it is known to treat one surface of a polyethylene film with a flame while the other surface of the film passes over a cooled support, e.g., a cooled drum. In some cases, however, this process is not completely satisfactory, for example when a polyolefin film is to be coated with a vinylidene chloride copolymer. In such cases, even treatment with a silent electric discharge, which is known as a further means for improving the adhesivity of polyolefin films, is only partially successful. It is also known to treat polyolefin films with chlorine gas while the films are exposed to ultraviolet irradiation. This method is time-consuming and difficult to perform, and this has restricted the industrial applicability thereof to date.

The present invention provides a process for the manufacture of improved polyolefin products, wherein the surface of a polyolefin product is treated with the flame of a burning gas mixture containing a halogen and/or a halogen-containing compound, until the adhesivity of the surface for a synthetic plastic coating has been increased. This process is simple to perform and yet extremely efficacious, even when the synthetic plastic material to be used for the coating is a vinylidene chloride copolymer.

The process of the present invention can be performed with any of the installations commonly used for the flame-treatment of the surfaces of articles made from polyolefins, in which one or more individual gas flames act upon the surface to be treated and in which, when the article to be treated is a film, it is conveyed past the gas flames while the reverse side of the film is cooled, e.g. by being conveyed over a cooled, revolving metal drum. The duration of the flame treatment may amount to about one second. The present process is preferably performed with the use as burner nozzles of so-called Daniell burners (oxyhydrogen burners), using one sleeve thereof for supplying air—or air and the halogen—and the other jet for supplying the combustible gas containing the desired addition of halogen—or the combustible gas alone, respectively.

In the present process, the desired result is substantially unaffected by the composition of the combustible halogen-containing gas mixture, so that any combination can be used that produces a steady flame. The combustible ingredient may be any combustible gas, e.g. hydrogen, methane, ethane, ethylene, propane, butane, or any other saturated or unsaturated hydrocarbon or carbon monoxide. The simplest procedure is to use city gas as the combustible gas ingredient, when this is available. For burning the combustible gas any gas containing a sufficiency of oxygen may be used, normally air.

Because of the ready accessibility thereof, the halogen most suitable for industrial purposes is chlorine. Other halogens, e.g. fluorine or bromine, also produce the desired result. It is also possible to use any mixture of halogen with halogen-containing compounds, mixtures of halogen compounds or mixtures with other reactive compounds, e.g. sulfur dioxide. When halogen-containing gaseous organic compounds are used, chlorinated compounds are the preferred reagents, for the reason given above. The halogen-containing gaseous organic compounds may be compounds that are gaseous under standard conditions, such as methyl chloride, ethyl chloride or methyl bromide, or they may be liquid or solid under standard conditions, constituting ingredients of the combustible gas mixture within the limits of their vapor pressures, for example sulfuryl chloride, thionyl chloride, chlorsulfonic acid, ethylene chloride, trichloroethylene, fluorochloromethanes or fluorochlorethanes.

As stated above, the halogen content may vary within wide limits since, on one hand, the maximum quantity of halogen or halogen-containing compound may be present which permits the steady combustion of the combustible gas while, on the other hand, in some cases relatively little halogen must be present to produce the desired results of this invention. In practical testing it has been established, for example, that mixtures are suitable which contain 15 to 40 parts by volume of city gas and 3 to 23 parts by volume of chlorine, per 100 parts by volume of air. Naturally, these values may not apply in all cases and are not critical.

The present process is applicable to all polyolefins, for example to polymers of ethylene, including polyethylenes of widely divergent densities, to polymers from propylene or isobutylene, to copolymers of these olefins and to mixtures of olefin polymers. It is equally suitable for the treatment of plates, films and tubes of all diameters and of articles made therefrom, such as tubular containers, and of articles of irregular shape (injection moldings).

The present process can be applied with particular advantage to the treatment of films, plates and other articles, preceding a coating operation with solutions or dispersions of copolymers of vinylidene chloride with acrylonitrile, acrylic acid, acrylic esters, methacrylic acid, methacrylic esters or with more than one of such polymerization components containing at least 80% by weight of vinylidene chloride groups. Such copolymers are available commercially, for example under the registered trade mark "Saran" (product of The Dow Chemical Company, Midland, Mich., U.S.A.) or under the registered trademark "Diofan" (product of Badische Anilin- und Soda-Fabrik, Ludwigshafen, Germany).

The following examples further illustrate the invention:

Example 1

The surface of a film about 75μ thick, manufactured by extrusion from high-pressure polyethylene having a density of 0.918, was exposed to the flame of a Daniell burner. To produce the flame, first city gas and then mixtures of city gas and chlorine of varying composition were fed into the inner jet, while air was supplied to the outer sleeve. The flame-treated surface of the film was coated with a solution of "Saran F 220" (a copolymer of vinylidene chloride and acrylonitrile) and then dried at a temperature of 70° C. The coating solution contained 15% by weight of the copolymer in acetone and the coating deposited on the dried film was 50 to 80μ thick. The adhesivity of the coating to the film was then measured and the values obtained are shown in Table I below. These data show that the treatments with air/city gas flames produced, at best, an adhesivity of 100 grams per cm., while air/city gas flames containing chlorine produced an adhesivity of 200 to 300 grams per cm.

TABLE I

| Test No. | Parts by volume of air | Parts by volume of city gas | Parts by volume of chlorine | Adhesivity in grams/cm. |
|---|---|---|---|---|
| 1 | | | | 0 |
| 2 | 100 | | | 0 |
| 3 | 100 | 12 | | up to 100 |
| 4 | 100 | 30 | | up to 100 |
| 5 | 100 | 60 | | 100 |
| 6 | 100 | 17 | 3 | 200 |
| 7 | 100 | 32 | 23 | 200 |
| 8 | 100 | 48 | 19 | 200 |
| 9 | 100 | 40 | 15 | 250 |
| 10 | 100 | 63 | 12 | 250 |
| 11 | 100 | 26 | 8 | 250 |
| 12 | 100 | 41 | 8 | 250 |
| 13 | 100 | 33 | 4 | 300 |
| 14 | 100 | 33 | 12 | 300 |
| 15 | 100 | 26 | 4 | 300 |

The adhesivity was measured on strips 1 cm. wide and is expressed as the force in grams required to pull the coating off the film over a strip width of 1 cm. These values are mean values from at least five measurements taken. Tests Nos. 1 and 2 refer, respectively, to the results in the case of untreated and air treated films.

The volumetric composition of the city gas used to produce the flame was, in percent by volume:

$CO_2$ ---- 2  $CH_4$ ---- 20
$CO$ ---- 13  $N_2$ ---- 15
$H_2$ ---- 50

The calorific value of the gas was 4300 kcal. per cubic meter.

Equally advantageous adhesion properties were found in the case of films which had been stored for 25 days from the flame-treatment to the coating operation, and of films where the coating was performed immediately following the flame treatment and the films were then stored for 25 days at room temperature.

*Example 2*

The procedure described in Example 1 was followed, but the film tested had been manufactured by extruding a polyethylene having a specific gravity of 0.95 to 0.96. The results of the experiments are shown in Table II below:

TABLE II

| Test No. | Parts by volume of air | Parts by volume of city gas | Parts by volume of chlorine | Adhesivity in grams/cm. |
|---|---|---|---|---|
| 16 | 0 | 0 | 0 | 0 |
| 17 | 100 | 12 | 0 | 20 |
| 18 | 100 | 40 | 0 | 20 |
| 19 | 100 | 70 | 0 | 20 |
| 20 | 100 | 8 | 3 | 200 |
| 21 | 100 | 12 | 3 | 200 |
| 22 | 100 | 16 | 8 | 200 |
| 23 | 100 | 26 | 4 | 200 |
| 24 | 100 | 37 | 10 | 200 |
| 25 | 100 | 41 | 8 | 200 |
| 26 | 100 | 67 | 7 | 200 |
| 27 | 100 | 18 | 5 | 250 |
| 28 | 100 | 28 | 13 | 250 |
| 29 | 100 | 48 | 19 | 250 |

The foregoing data show that a city gas flame produced only very minor adhesivity values, while upon addition of chlorine, the adhesivity rose to about 200 to 250 grams per cm. Also in this table the values listed are the mean values of at least five measurements taken. When the films were stored for 25 days, as described in Example 1, they also exhibited good adhesivity values.

*Example 3*

A polypropylene film was flame-treated and coated as described in Example 1. The results obtained are listed in the following table:

TABLE III

| Test No. | Parts by volume of air | Parts by volume of city gas | Parts by volume of chlorine | Adhesivity in grams/cm. |
|---|---|---|---|---|
| 30 | | | | 0 |
| 31 | 100 | 12 | 0 | 0 |
| 32 | 100 | 40 | 0 | 0 |
| 33 | 100 | 70 | 0 | 0 |
| 34 | 100 | 8 | 3 | about 80 |
| 35 | 100 | 12 | 3 | 50 |
| 36 | 100 | 16 | 8 | 80 |
| 37 | 100 | 26 | 4 | 80 |
| 38 | 100 | 37 | 10 | 60 |
| 39 | 100 | 41 | 8 | 70 |
| 40 | 100 | 67 | 7 | 50 |
| 41 | 100 | 18 | 5 | 70 |
| 42 | 100 | 28 | 13 | 80 |
| 43 | 100 | 48 | 19 | 80 |

When polypropylene films were flame-treated with a flame containing chlorine, their adhesivity was appreciably improved, as shown by the above data.

It will be obvious to those skilled in the art that many modifications may be made within the scope of the present invention without departing from the spirit thereof, and the invention includes all such modifications.

What is claimed is:

1. A process for the production of an improved polyolefin product which comprises treating the surface of a polymer selected from the group consisting of polyethylene, polypropylene, polyisobutylene and copolymers and mixtures thereof, with the flame of a burning gas mixture composed of a halogen, at least one member selected from the group consisting of air or oxygen, and at least one member selected from the group consisting of a hydrocarbon or carbon monoxide, for a time sufficient to increase the adhesivity of the surface to a synthetic plastic coating.

2. A process according to claim 1 in which the polyolefin product is polyethylene.

3. A process according to claim 1 in which the polyolefin product is polypropylene.

4. A process according to claim 1 in which the gas mixture is city gas and air in admixture with chlorine.

References Cited

UNITED STATES PATENTS

| | | | |
|---|---|---|---|
| 2,502,841 | 4/1950 | Henderson | 117—138.8 |
| 2,767,103 | 10/1956 | Loukomsky | 117—46 |
| 2,805,960 | 9/1957 | Wolinski | 117—138.8 X |
| 2,968,576 | 1/1961 | Keller et al. | 117—47 |
| 3,036,930 | 5/1962 | Grimminger et al. | 117—138.8 X |

ALFRED L. LEAVITT, *Primary Examiner.*

H. COHEN, *Assistant Examiner.*